A. L. & J. S. AUERBACH.
PRESERVING AND SHIPPING RECEPTACLE.
APPLICATION FILED MAR. 18, 1910.
983,866.
Patented Feb. 14, 1911.
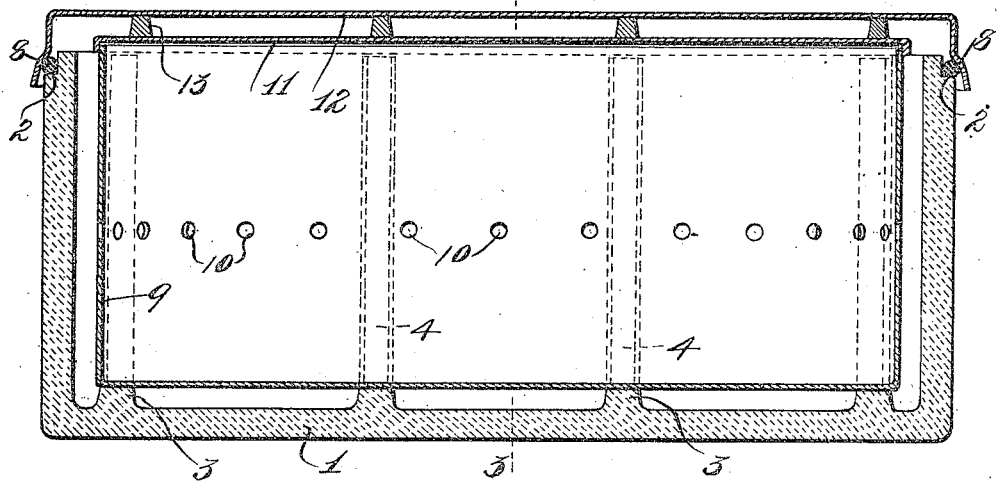
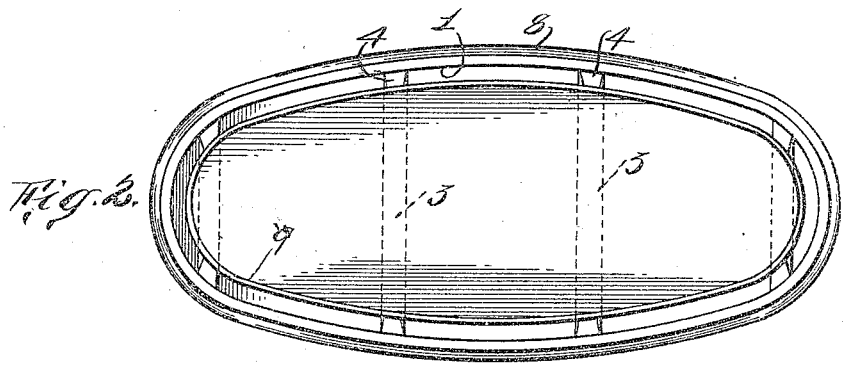
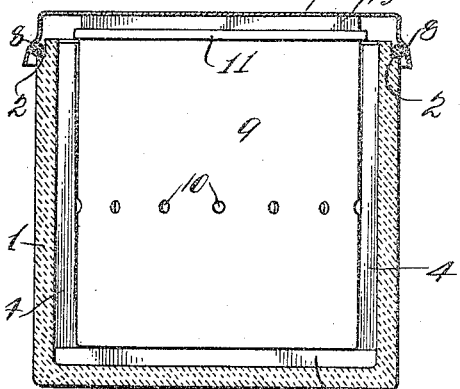 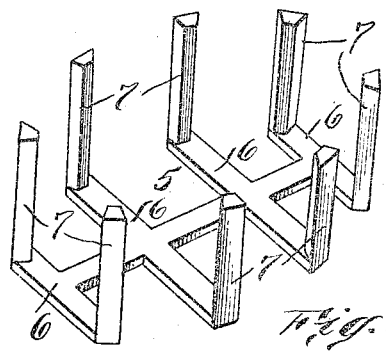
Witnesses:
C. A. Jarvis
Francis J. Mockel
Inventors
A Leopold Auerbach
Joseph S. Auerbach
by Ferdinand E. M. Gallowa
Attorney

UNITED STATES PATENT OFFICE.

A LEOPOLD AUERBACH AND JOSEPH S. AUERBACH, OF NEW YORK, N. Y.

PRESERVING AND SHIPPING RECEPTACLE.

983,866.  Specification of Letters Patent.  Patented Feb. 14, 1911.

Application filed March 18, 1910. Serial No. 550,249.

*To all whom it may concern:*

Be it known that we, A LEOPOLD AUERBACH and JOSEPH S. AUERBACH, citizens of the United States, residing at the city of New York, New York State, have invented certain new and useful Improvements in Preserving and Shipping Receptacles, of which the following is a clear, full, and exact description.
This invention relates to improved boxes or receptacles for preservation or shipment of merchandise, particularly such class of goods as spoil or become stale if exposed to the atmosphere, and sudden changes of temperature.

The particular object of the invention is to provide a box or receptacle so constructed that the contents are maintained in a vacuum or rarefied atmosphere and are held away from contact with the inside of the exterior walls of receptacle, thus preventing sudden changes of temperature through conduction of heat.

In carrying out the invention there is provided an impervious outer vessel or receptacle, and an inner vessel of pervious construction or material. Means are provided to hold the inner vessel away from contact with the inner walls of the outer vessel.
Spaced supporting strips between the two serve this purpose and effectually prevent the major part of the inner vessel from contacting with the outer vessel's wall. Any known means for creating a vacuum in the two vessels may be used after the goods have been placed in the inner receptacle. Any suitable valve or valve cover mechanism may be provided to maintain the vacuum until it is desired to get at the contents.
The particular form of vacuum retaining means which is illustrated and described in this specification consists of a cap which may, if desired, be of metal provided with a depending flared out skirt. The outer receptacle may be made of wood, glass or metal and be unyielding. It is preferably provided with a collar or rim around its perimeter, on which reposes a continuous band, preferably of rubber. The flared skirt of the cover fits and rests on such band after the vacuum is created and the external air pressure can then be relied upon to hold the cover tightly in place to maintain the vacuum previously created.
The scope of the invention will be pointed out in the claim.

In the accompanying drawings: Figure 1 is a vertical longitudinal cross section of a receptacle constructed in accordance to this invention. Fig. 2 is a plan view of such a receptacle with the cover removed. Fig. 3 is a transverse section on line 3—3, Fig. 1. Fig. 4 is a perspective view of a supporting cradle for the inner box of a modified form of construction.

In the drawings, 1 is the outer vessel, provided with an annular ledge 2 around its perimeter and with spacing supporting strips 3 on its bottom and like strips 4 on its sides. These are shown in Fig. 1 as being integral with the receptacle 1 itself. However, such strips may take the construction shown in Fig. 4 and be set into the outer vessel as a separate cradle 5, having cross strips 6 and vertical strips 7.

A rubber band 8 is placed around the vessel and rests on the ledge 2. The inner vessel 9 may be of any material pervious to the air. Cardboard for the candy trade is well adapted for use. I may provide the vessel 9 with perforations 10 for the more ready evacuation of that vessel under pump action.

The inner vessel 9 is preferably provided with a cover 11. The outer vessel 1 is preferably provided with a cover 12, having spacing strips 13 to prevent the cover 11 from coming in contact therewith, and to strengthen the cover against collapse through the atmospheric pressure upon its surface.

In use the candies or other goods are placed in the inner vessel 9, the cover put in place and the box pushed down or wedged in place upon and between the supporting strips. The cap or cover 12 is then placed in position and the air exhausted by suitable means, and after proper vacuum is established the cover will, as before described, seat itself firmly and tightly on the rubber band and seal the receptacle against entrance of air, because of the external atmospheric pressure.

In carrying out this invention, details of construction may be varied from those shown, and yet the essence of the invention be retained; some parts might be employed without others, and new features thereof might be combined with elements old in the art in diverse ways, although the herein described type is regarded as embodying substantial improvements over such modifications.

As many changes could be made in the above construction, and many apparently widely different embodiments of the invention could be made without departing from the scope thereof, it is intended that all matter contained in the above description or shown in the accompanying drawings shall be interpreted in an illustrative and not in a limiting sense. It is furthermore desired to be understood that the language used in the following claim is intended to cover all the generic and specific features of the invention herein described, and all statements of the scope of the invention which as a matter of language might be said to fall therebetween.

We claim as our invention:

The herein described receptacle for preservation or shipment of merchandise comprising an outer single wall chamber of impervious material open at the top and having a ledge around the outside of the vessel near the top, an air sealing ring on said ledge, an independent covered chamber pervious to air within the outer chamber, means for supporting the inner chamber substantially out of contact with all the walls of the outer chamber, a cover for the outer chamber held in place merely by atmospheric pressure, having a depending rim adapted to fit against the aforesaid sealing ring and means for holding said cover substantially out of contact with the inner chamber and a common rarefied space for chambers.

Signed at New York, N. Y., this 16 day of March, 1910.

A LEOPOLD AUERBACH.
JOSEPH S. AUERBACH.

Witnesses:
ARTHUR J. SAUGBEIN,
LOUIS MEYER.